(12) United States Patent
Singer-Harter

(10) Patent No.: US 7,537,156 B2
(45) Date of Patent: *May 26, 2009

(54) RETAIL STORE FLY-AROUND PRODUCT LOCATOR

(75) Inventor: Debra Lin Singer-Harter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 11/832,521

(22) Filed: Aug. 1, 2007

(65) Prior Publication Data

US 2008/0017708 A1 Jan. 24, 2008

Related U.S. Application Data

(63) Continuation of application No. 11/157,255, filed on Jun. 21, 2005, now Pat. No. 7,309,009.

(51) Int. Cl.
*G06K 15/00* (2006.01)

(52) U.S. Cl. ...................... 235/383; 235/375

(58) Field of Classification Search .................. 235/383, 235/385, 375, 381, 382, 472.01, 487; 705/22, 705/28, 26
See application file for complete search history.

(56) References Cited

U.S. PATENT DOCUMENTS 6,954,735 B1 * 10/2005 Djupsjobacka et al. ........ 705/27
2007/0150369 A1 * 6/2007 Zivin ........................... 705/26

* cited by examiner

*Primary Examiner*—Edwyn Labaze
(74) *Attorney, Agent, or Firm*—Dillon & Yudell LLP

(57) ABSTRACT

A method, system, computer program product and service for aiding a shopper in locating a product in a store are presented. The shopper enters an identifier for a desired product into a wireless computer, such as a tablet computer or a Personal Digital Assistant (PDA). A server determines both where the shopper is presently located (starting physical location) and where the desired product is located (final physical location) in the store. The server then sends the wireless computer a real-time image that corresponds with a changing physical location of the shopper, such that the shopper is able to find the desired product by following a travel pathway to the final physical location of the desired product.

17 Claims, 19 Drawing Sheets

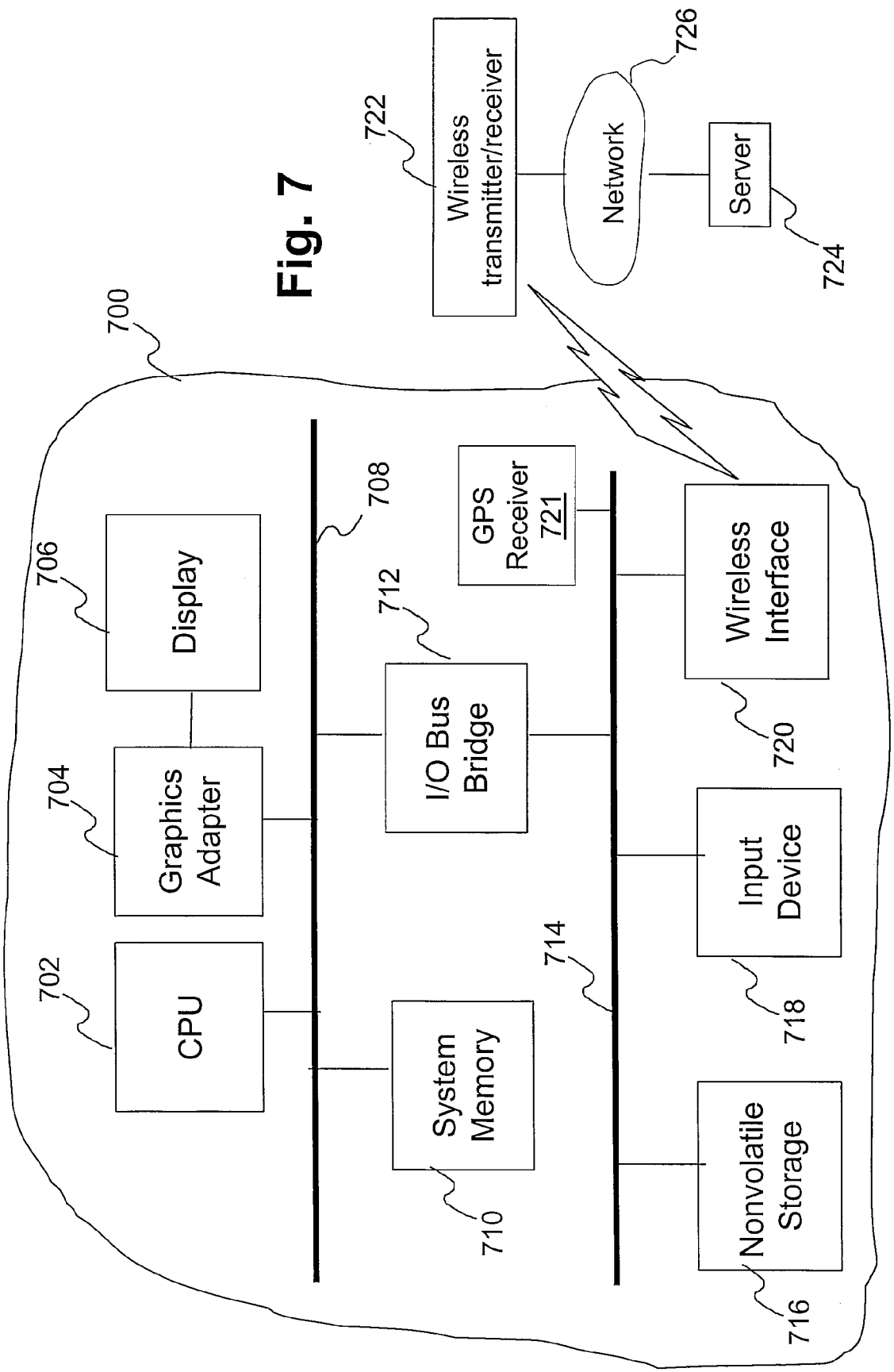

RETAIL STORE FLY-AROUND PRODUCT LOCATOR

The present application is a continuation of U.S. patent application Ser. No. 11/157,255, filed on Jun. 21, 2005, and entitled, "Retail Store Fly-Around Product Locator," which is incorporated herein by reference.

BACKGROUND OF THE INVENTION

1. Technical Field

The present invention relates in general to the field of computers, and in particular to a wireless computer system used to physically locate a product. Still more particularly, the present invention relates to a method and system for displaying a real-time mapping image used to fly-around an establishment to provide directions to a desired product.

2. Description of the Related Art

Few things in life are as frustrating, especially to those persons with low vision, than finding a particular product on a supermarket shelf. This is particularly true when trying to locate a physically small and relatively obscure item, such as certain specialty or gourmet items, which is usually stocked either on a high shelf or a low shelf, neither of which are at eye level and easy to spot.

The shopper looking for the item must typically find and ask directions from a store employee, who may or may not be available and who may or may not know the exact location of the desired product. For those shoppers with low vision, even directions to the appropriate aisle on which the item is stocked are often unhelpful, since the low vision shopper may not be able to read aisle marker signs (which are usually physically elevated above her reading field of vision), much less see and locate the small product on the long shelves on the aisle to which she is directed.

SUMMARY OF THE INVENTION

The address the limitations of the prior art, a method, system, computer program product and service for aiding a shopper in locating a product in a store is presented. The shopper enters an identifier for a desired product into a wireless computer, such as a tablet computer or a Personal Digital Assistant (PDA). A server determines both where the shopper is presently located (starting physical location) and where the desired product is located (final physical location) in the store. The server then sends the wireless computer a real-time image that corresponds with a changing physical location of the shopper, such that the shopper is able to find the desired product by following a travel pathway to the final physical location of the desired product.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

FIG. 7 depicts an exemplary wireless device that can be used to receive and display block or scenery maps;

DETAILED DESCRIPTION OF THE PREFERRED EMBODIMENT

Figure 1:
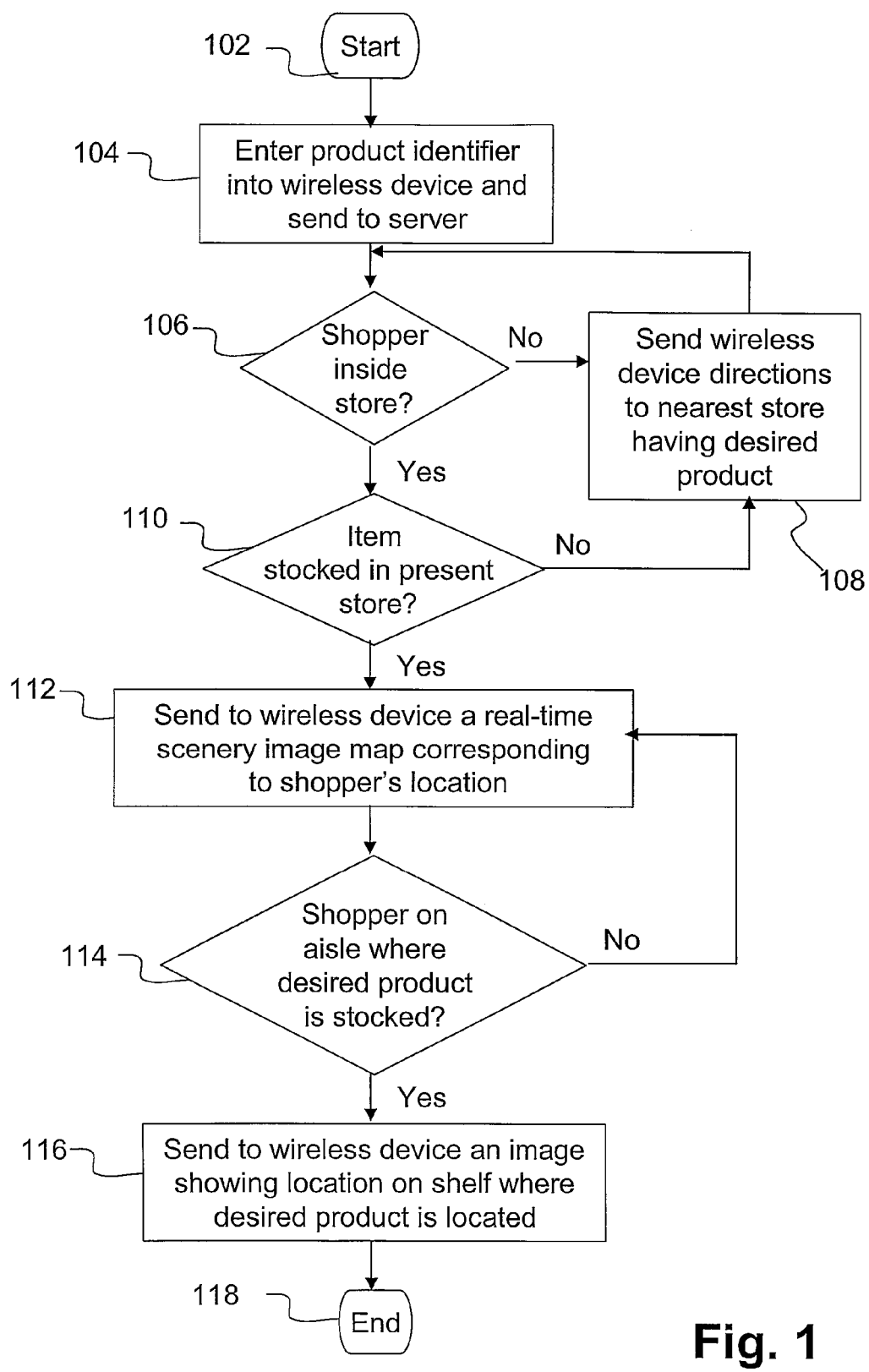
FIG. 1 illustrates a high-level flow chart of a preferred embodiment of the presently disclosed process.

With reference now to the figures, and in particular to FIG. 1, there is depicted a high level flow chart of the presently described method. After initiator block 102, the process moves to the step shown in block 104, in which a shopper enters a product identifier for a desired product into a wireless device, such as a tablet or laptop computer, a Personal Digital Assistant (PDA), a smart phone, etc. An exemplary wireless device is illustrated in FIG. 7, and will be discussed in detail below. Understand for now that the wireless device has an input device that permits the user to enter the product identifier into the wireless device.

Figure 2A:
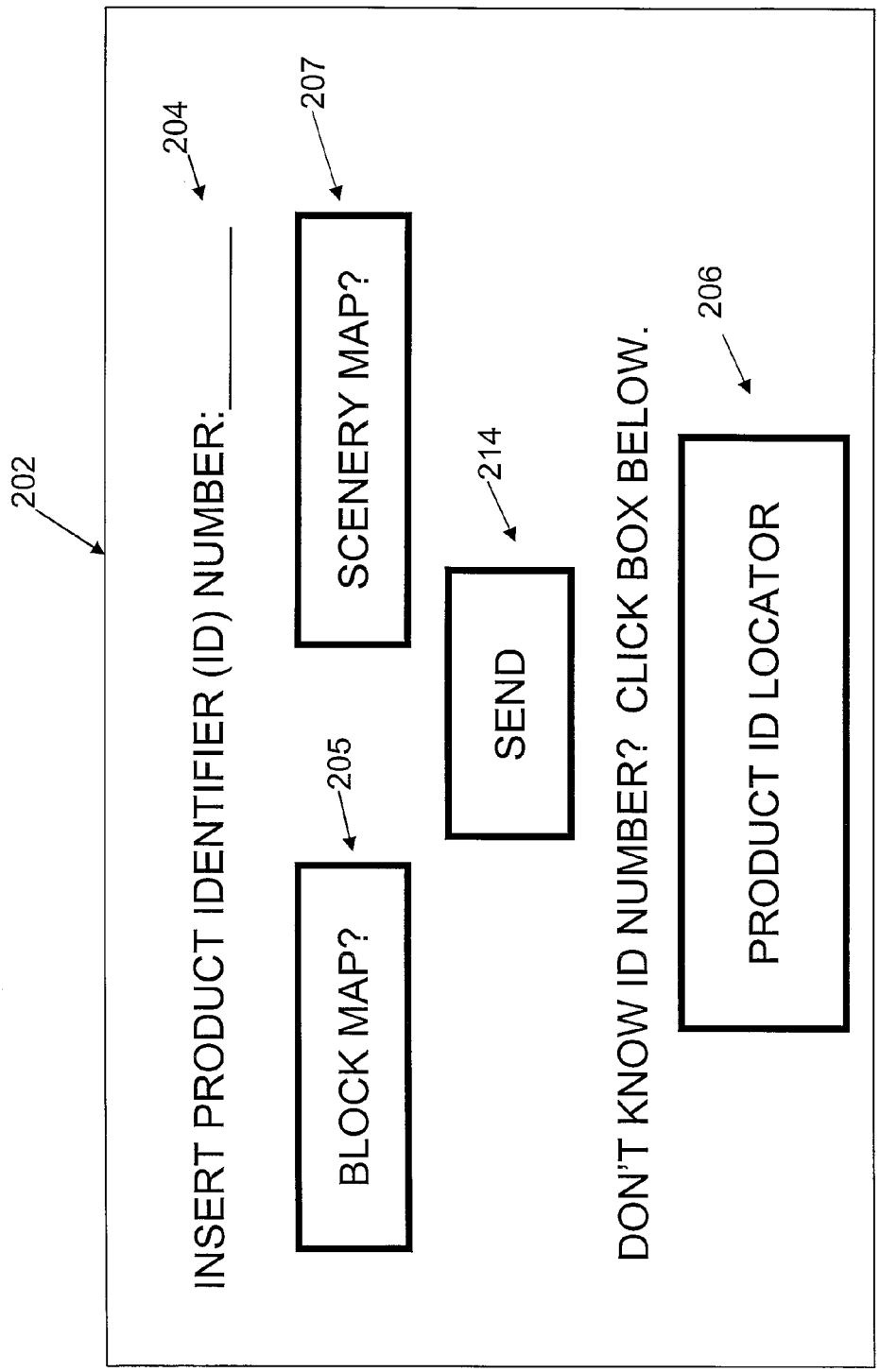
FIG. 2a depicts a Graphical User Interface (GUI) allowing a shopper to enter an Identifier (ID) number for a desired product, as well as an option to receive either a block map or a scenery map giving directions to the desired product.

Referring now to FIG. 2a, an exemplary Graphical User Interface (GUI) 202 on a display of the wireless device is depicted. The shopper is invited to enter into active field 204 the product identifier (ID) number of the desired product. The shopper can click button 205 if he wishes to receive a product locating block map (such as shown below in FIG. 3 or 5), or button 207 if he wishes to receive a scenery map (such as shown below in FIGS. 6a-b).

Figure 2B:
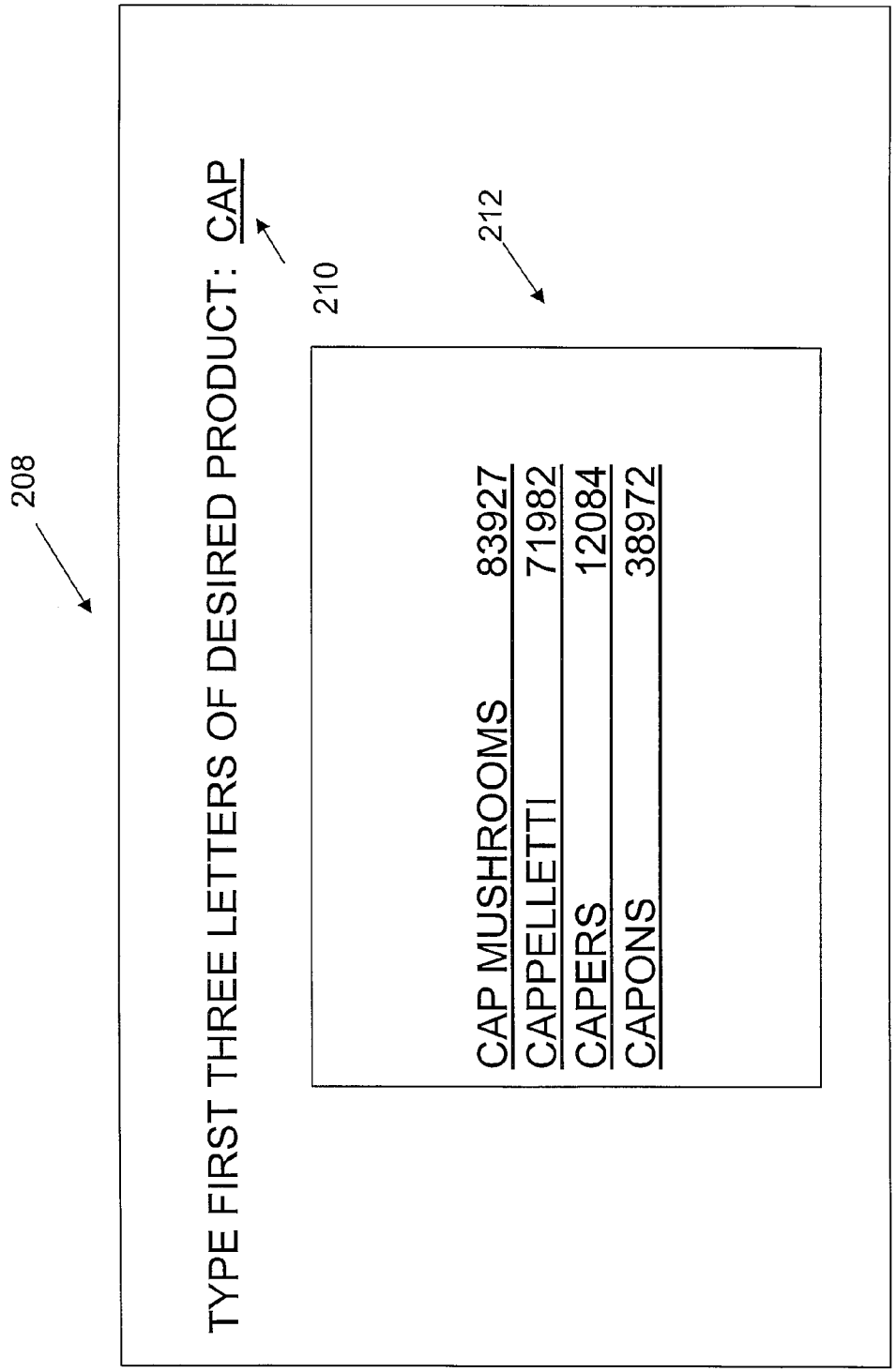
FIG. 2b illustrates a GUI providing the necessary ID number for the desired product.

If the shopper does not know the product ID number, then he can click button 206, which causes a GUI 208, shown in FIG. 2b, to be displayed on the wireless device. GUI 208 has another active field 210, which accepts as an input the first three letters of the desired product. Assume for purposes of illustration that the shopper is looking for capers, a product that is normally in a small jar and is difficult to find. The shopper enters the letters "CAP" in active field 210, which results in window 212 being populated with several different products and their respective product ID numbers, including "CAPERS" and its product ID number "12084." In a preferred embodiment, "CAPERS" can be clicked by the shopper, resulting in the product ID number "12084" automatically being sent to a server (along with the location and identification of the wireless device and or/the user of that wireless device) that will provide the shopper directions to where capers are located.

Referring back to FIG. 2a, if the shopper knew the product ID number "12084" for capers, or if clicking "CAPERS" in window 212 results in "12084" populating active field 204, then the shopper can manually click the "SEND" button 214 preferably after clicking either button 205 or button 207), which causes "12084" to be sent to the server, along with the location and identification of the wireless device and/or the user of that wireless device.

Figure 3:
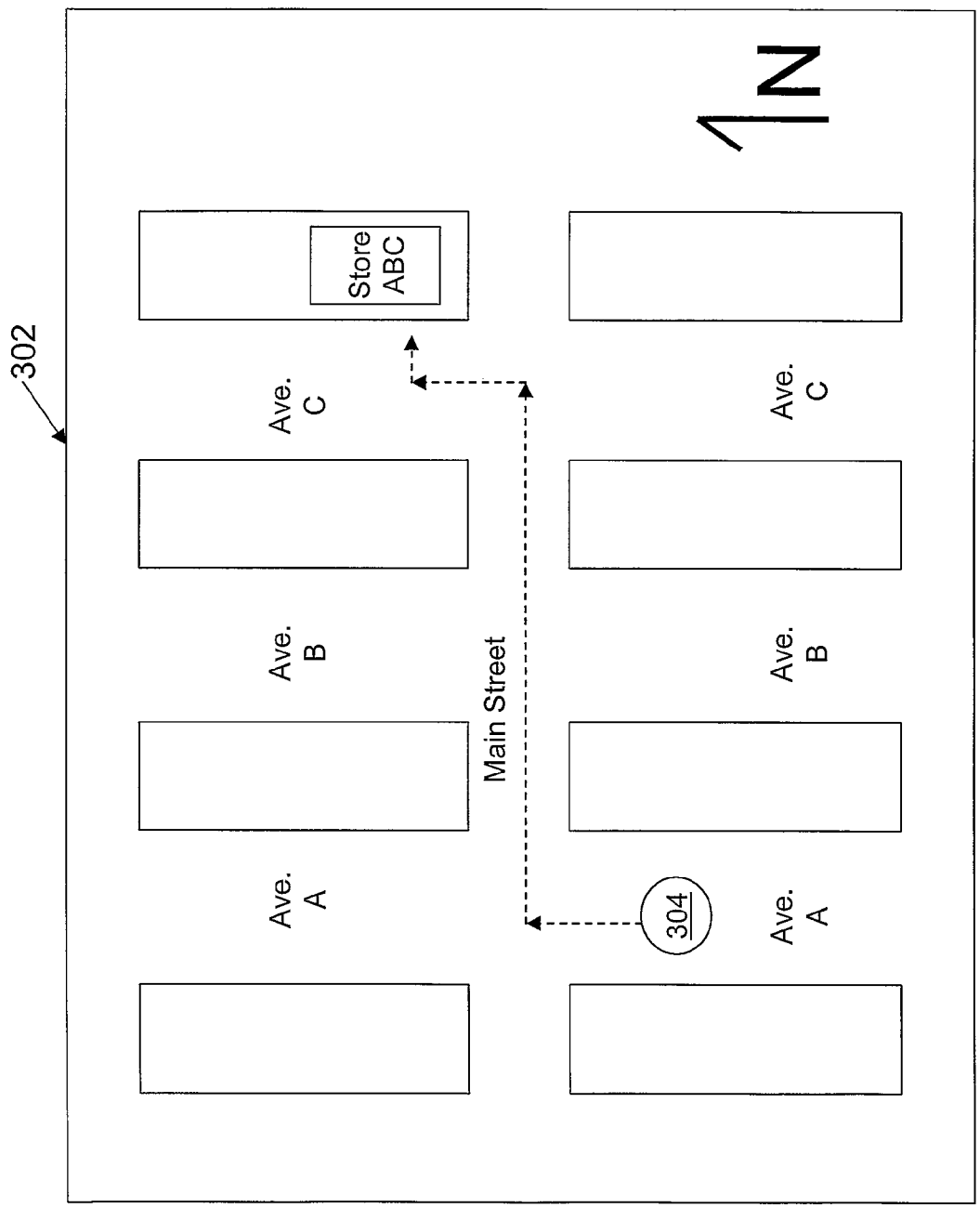
FIG. 3 depicts a street map giving the shopper directions to a nearest store that has the desired product in stock.

As shown in query block 106, a determination is made as to whether the shopper is presently inside a store. If not, then a server will send directions to the shopper's wireless device providing directions (either written, verbal, or graphical, as shown in FIG. 3) to the nearest store having the desired capers (block 108). In the illustrative GUI 302 shown in FIG. 3, a shopper 304 is directed to proceed north on Avenue A, east on Main Street, and the north on Avenue C to the location of Store ABC, which has the desired capers in stock.

Figure 5:
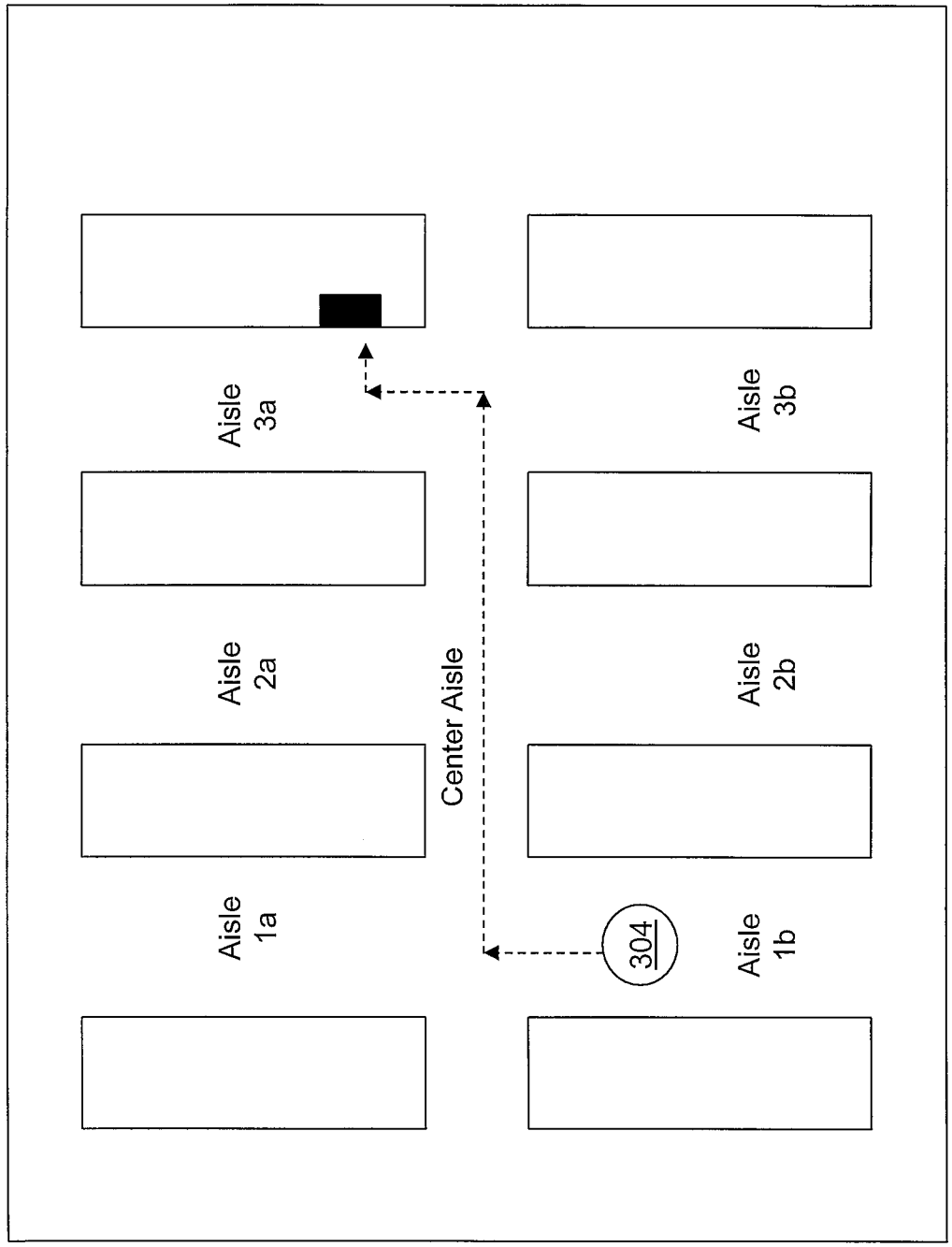
FIG. 5 depicts a block map giving the shopper directions to the desired product within the store.
Figure 6A:
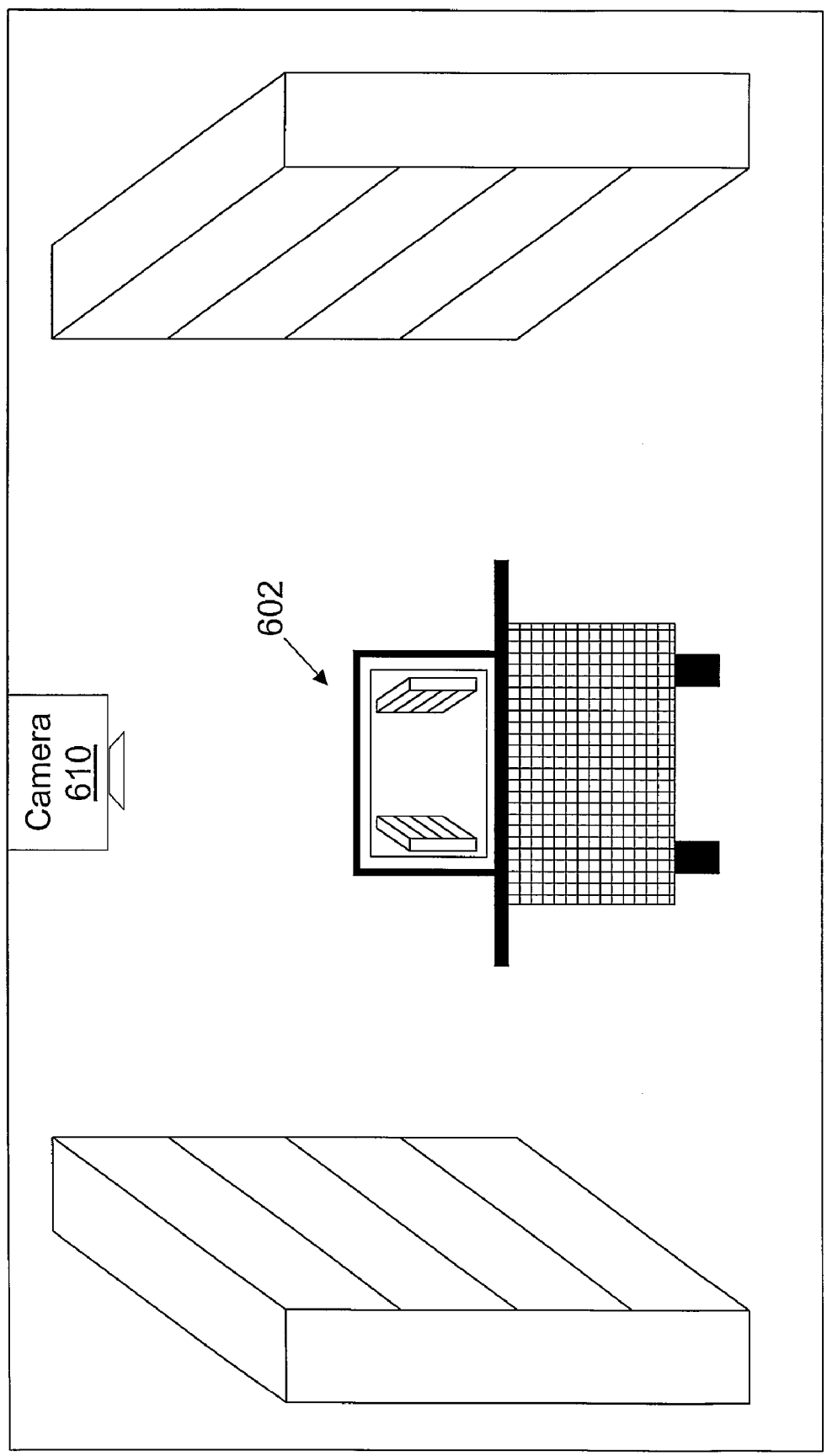
FIGS. 6a-b illustrate a display showing a real-time scenery map that permits the shopper to "fly-around" the store by following visual cues on the display that match a live environment.
Figure 6B:
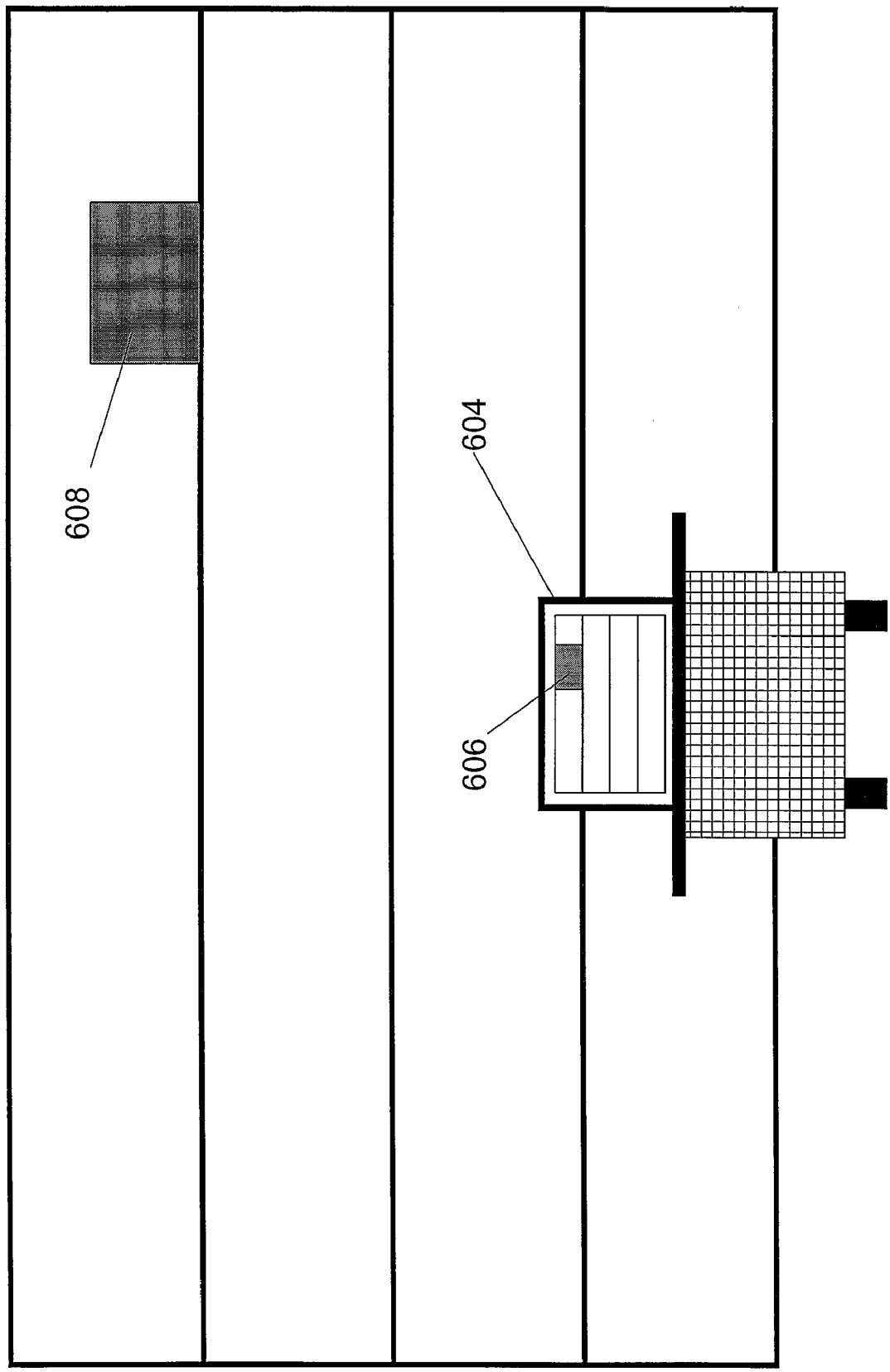

Returning to FIG. 1, if the shopper is already inside a particular store, but the store is out of stock of the desired exemplary capers (query block 110), then the server sends directions to the shopper in a block map such as those shown in FIG. 5 or a scenery image map such as shown in FIGS. 6a-b.

Figure 4B:
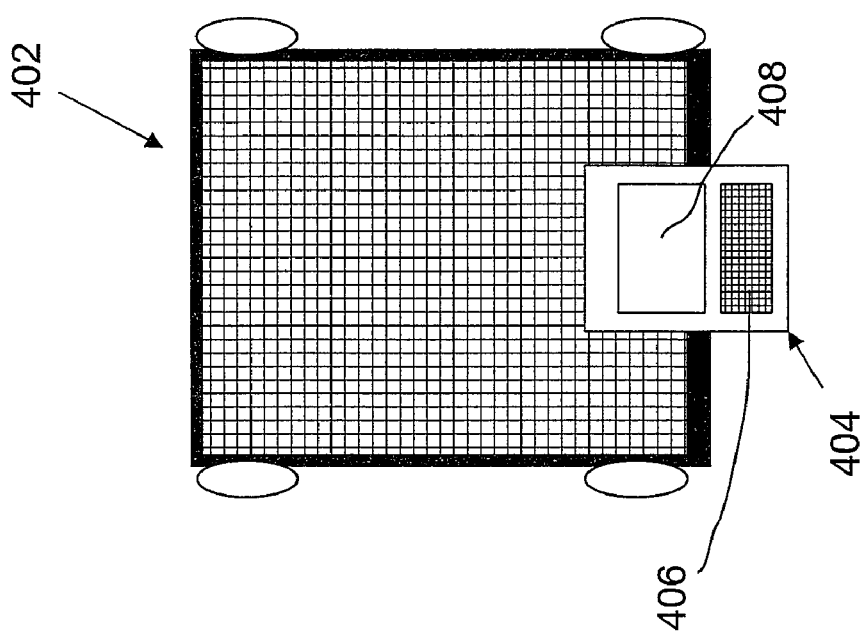
FIGS. 4a-b illustrate a shopping cart with a coupled wireless device for receiving and displaying either the block map or the scenery map.
Figure 4A:
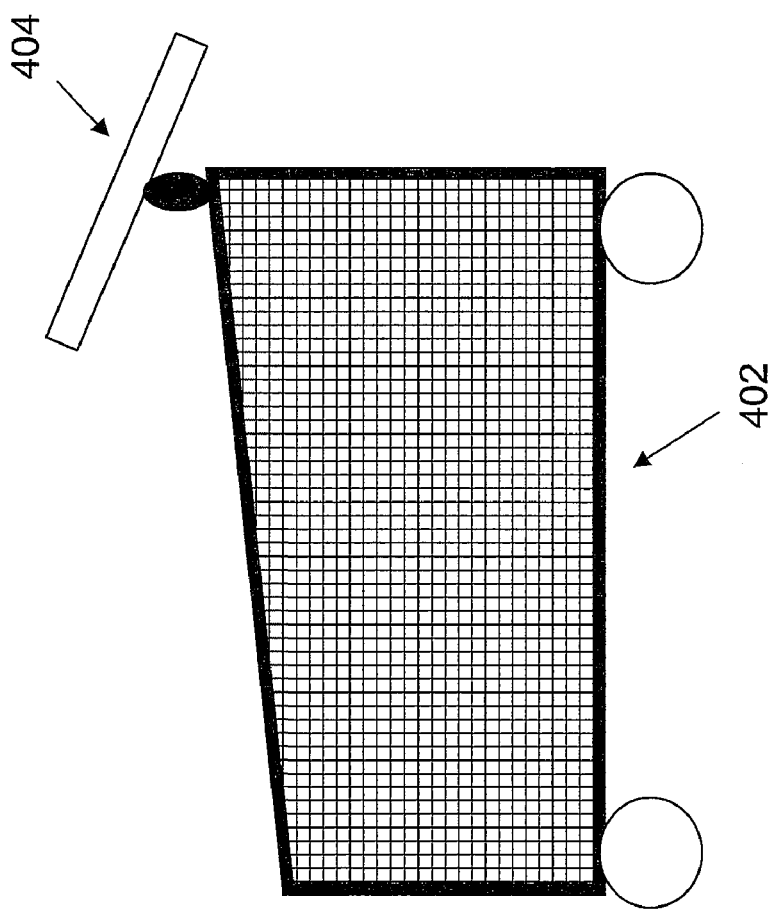

As described in block 112 of FIG. 1, assuming that the shopper is in the store where the desired capers are in stock, a preferred real-time scenery image corresponding to the shopper's physical location within the store is sent to the shopper's wireless device (block 112). Consider an exemplary arrangement shown in FIGS. 4a-b, in which a shopping cart 402 has an attachable wireless device 404, such as a table computer, PDA, etc. Preferably, wireless device 404 has one or more input devices, such as a keyboard 406, and a display 408, which alternatively may be a touch screen input device. In one embodiment, code for a GUI 502 such as depicted in exemplary form in FIG. 5 may be sent to wireless device 404 for viewing on display 408. GUI 502 provides a concise map of the store in which shopper 304 is located, as well as his current physical location within that store. This current location can be determined by a Global Positioning System (GPS) device within wireless device 404, or by a local positioning system within the store, using short-range Infrared or radio frequency (RF) or similar signal pinging and triangulation.

However, in the preferred embodiment of the present invention, wireless device 404 receives and displays a real-time scenery image, such as shown in GUI 602 shown in FIG. 6a. As shown, GUI 602 shows a same scenery image as the shopper sees with his naked eye. As an exemplary orientation map of the shopper's present location, again consider the map shown in FIG. 5. Assume that FIG. 6a shows the view seen by the shopper when walking down "Aisle 1b" as shown in FIG. 5. When the shopper reaches the "Center Aisle," the view shown in GUI 602 of FIG. 6a changes, giving the shopper a view of "Center Aisle" as shown by the arrow in FIG. 5. Thus, rather than having to match a map with a location, the shopper simply matches what he sees with his naked eye with what is shown on the GUI 602. The shopper is thus able to "fly-around" the store until he reaches the location of the desired capers (query block 114 of FIG. 1). As seen in FIG. 6b, when the shopper reaches "Aisle 3a" (shown in the map in FIG. 5), then a new GUI 604 is presented (block 116 in FIG. 1), which highlights an area 606 that corresponds with a stocking area shown as a shelf area 608 on which the capers are located. Thus the shopper is led to the exact area where the desired product is located by simply following the scenery map image shown in the wireless device, and the process ends (terminator block 118 in FIG. 1).

Referring now to FIG. 7, a block diagram of an exemplary data processing system which can be used as the wireless device 404 introduced above is presented as a data processing system 700. Data processing system 700 includes a central processing unit (CPU) 702, which is connected to a system bus 708. In the exemplary embodiment, data processing system 700 includes a graphics adapter 704 also connected to system bus 708, for providing user interface information to a display 706, such as display 408 described above in FIG. 4b.

Also connected to system bus 708 are a system memory 710 and an input/output (I/O) bus bridge 712. I/O bus bridge 712 couples an I/O bus 714 to system bus 708, relaying and/or transforming data transactions from one bus to the other. Peripheral devices such as nonvolatile storage 716, which may be a hard disk drive, flash memory, etc., and input device 718, which may include a conventional keyboard, mouse, a trackball, or the like, as well as a bar code or similar reader or a card reader or other similar device, is connected to I/O bus 714. Data processing system 700 will perform the method of the present invention using software, stored in memory system 710 and executed on CPU 702. The construction and use of software structures is well understood by those skilled in the relevant arts.

Data processing system 700 also includes a wireless interface 720. Wireless interface 720 is an interface that permits data processing system 700 to wirelessly communicate, using cellular phone technology and/or local low-power signals, with another data processing system, such as a short-range transmitter/receiver system 722, which also communicates with a server 724, preferably via a network 726. Data processing system 700 also includes a Global Positioning System (GPS) receiver 721, which enables a determination of an exact real-time location of data processing system 700.

The exemplary embodiment shown in FIG. 7 is provided solely for the purposes of explaining the invention. Those skilled in the art will recognize that numerous variations are possible, both in form and function. For instance, data processing system 700 might also include a compact disk read-only memory (CD-ROM) or digital versatile disk (DVD) drive, a sound card and audio speakers, and numerous other optional components. All such variations are believed to be within the spirit and scope of the present invention.

Figure 8:
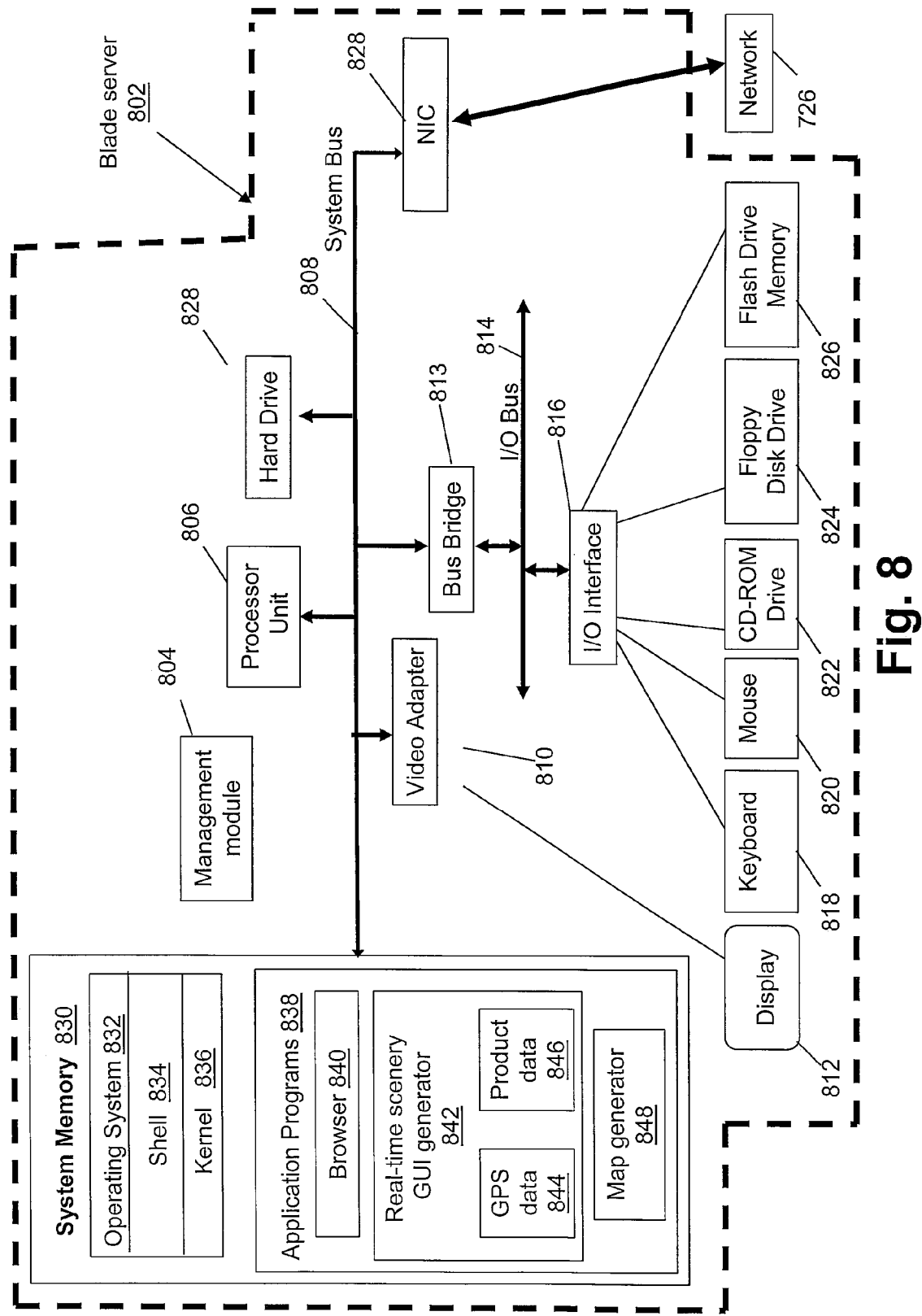
FIG. 8 illustrates an exemplary server that may be used to generate and transmit the block or scenery maps to the wireless device of FIG. 7.

With reference now to FIG. 8, there is depicted a block diagram showing additional detail of server 724, which is shown for exemplary purposes as one or more blade servers 802 found in a blade server computer (not shown, but understood to be composed of a chassis holding multiple blade servers, each of which have one or more processors). Blade server 802 includes a management module 804, which permits coordination of operations among other blade servers 802 within the blade server computer.

Blade server 802 also includes a processing module depicted as a processor unit 806, which may be one or more processors operating in harmony, coupled to a system bus 808. Also coupled to system bus 808 is a video adapter 810, which drives/supports a display 812.

System bus 808 is coupled via a bus bridge 813 to an Input/Output (I/O) bus 814. Coupled to I/O bus 814 is an I/O interface 816, which affords communication with various I/O devices, including a keyboard 818, a mouse 820, a Compact Disk—Read Only Memory (CD-ROM) drive 822, a floppy disk drive 824, and a flash drive memory 826. The format of the ports connected to I/O interface 816 may be any known to those skilled in the art of computer architecture, including but not limited to Universal Serial Bus (USB) ports.

Blade server 802 is able to communicate with network 726 via a network interface such as Network Interface Card (NIC) 828, which is coupled to system bus 808. Network 726 may be a Local Area Network (LAN), a Wireless LAN (WLAN), a cellular telephone network, a Wide Area Network (WAN) such as the Internet, or any other similar network, preferably wireless.

Also coupled to system bus 808 is a system memory 830. Data that populates system memory 830 includes blade server 802's operating system 832, which includes a command interpreter program known as a shell 834, which is incorporated in a higher level operating system layer and utilized for providing transparent user access to resources such as application programs 838.

As is well known in the art, a command interpreter or "shell" is generally a program that provides an interpreter and interfaces between the user and the operating system. More specifically, a shell program executes commands that are entered into a command line user interface or from a file. The shell (UNIX) or command processor (Windows) is generally the highest level of the operating system software hierarchy and serves as a command interpreter. The shell typically provides a system prompt, interprets commands entered by keyboard, mouse, or other user input media, and sends the interpreted command(s) to the appropriate lower levels of the operating system (e.g., a kernel 836) for processing.

Exemplary application programs 838 used in the present invention are a web browser 840 and real-time scenery GUI generator 842. Web browser 338 includes program modules and instructions enabling a World Wide Web (WWW) client (i.e., blade server 802) to send and receive network messages to the network 726, which may be the Internet, using Hyper-Text Transfer Protocol (HTTP) messaging.

Real-time scenery GUI generator 842 utilizes GPS data 844 received by GPS receiver 721 shown in wireless device 700 in FIG. 7. This GPS data, which shows the exact real-time location of the wireless device (and presumably the shopper using that wireless device), is incorporated by real-time scenery GUI generator 842 to create the real-time scenery GUI, either using pre-recorded animation, real-time video (based on an in-store camera feed chosen by the real-time location of the shopper, which is based on GPS data 844 from GPS receiver 721), or pre-recorded video. That is, the real-time scenery GUI, such as shown in FIG. 6a, may be created (and continuously updated according to the real-time physical location of the wireless device) using pre-recorded animation, pre-recorded video, or live video feed (from cameras within the store such as camera 610 shown in FIG. 6a) that depict, with the shoppers real-time physical location, the layout, shelving, and stocking pattern found in the store. Note also that real-time scenery GUI generator 842 utilizes product data 846, which is a database showing which store(s) has a particular product, and where in each store (aisle number, shelf number, Cartesian coordinate on shelving, etc.) that product is physically located. This information results in the real-time scenery GUI generator 842 defaulting to a map generator 848 if the product is located in another store or if the shopper is outside (to generate a street map to the proper store), or executing map generator 848 if the shopper is inside the store having the product and selects an option to receive a map such as shown in FIG. 5.

In an alternate embodiment, product data 846 can also include information regarding the manufacturer of each product, size/quantities in stock, dietary information regarding each product, coupon offers related to each product, etc., which information can likewise be sent to the wireless device 404 for display to the shopper, either automatically or at the shopper's request.

Note that the hardware and software elements depicted in blade server 802 are not intended to be exhaustive, but rather are representative to highlight essential components required by the present invention. For instance, blade server 802 may include alternate memory storage devices such as magnetic cassettes, Digital Versatile Disks (DVDs), Bernoulli cartridges, and the like. These and other variations are intended to be within the spirit and scope of the present invention.

While a preferred embodiment of the present invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

Software Deployment

Figure 9A:
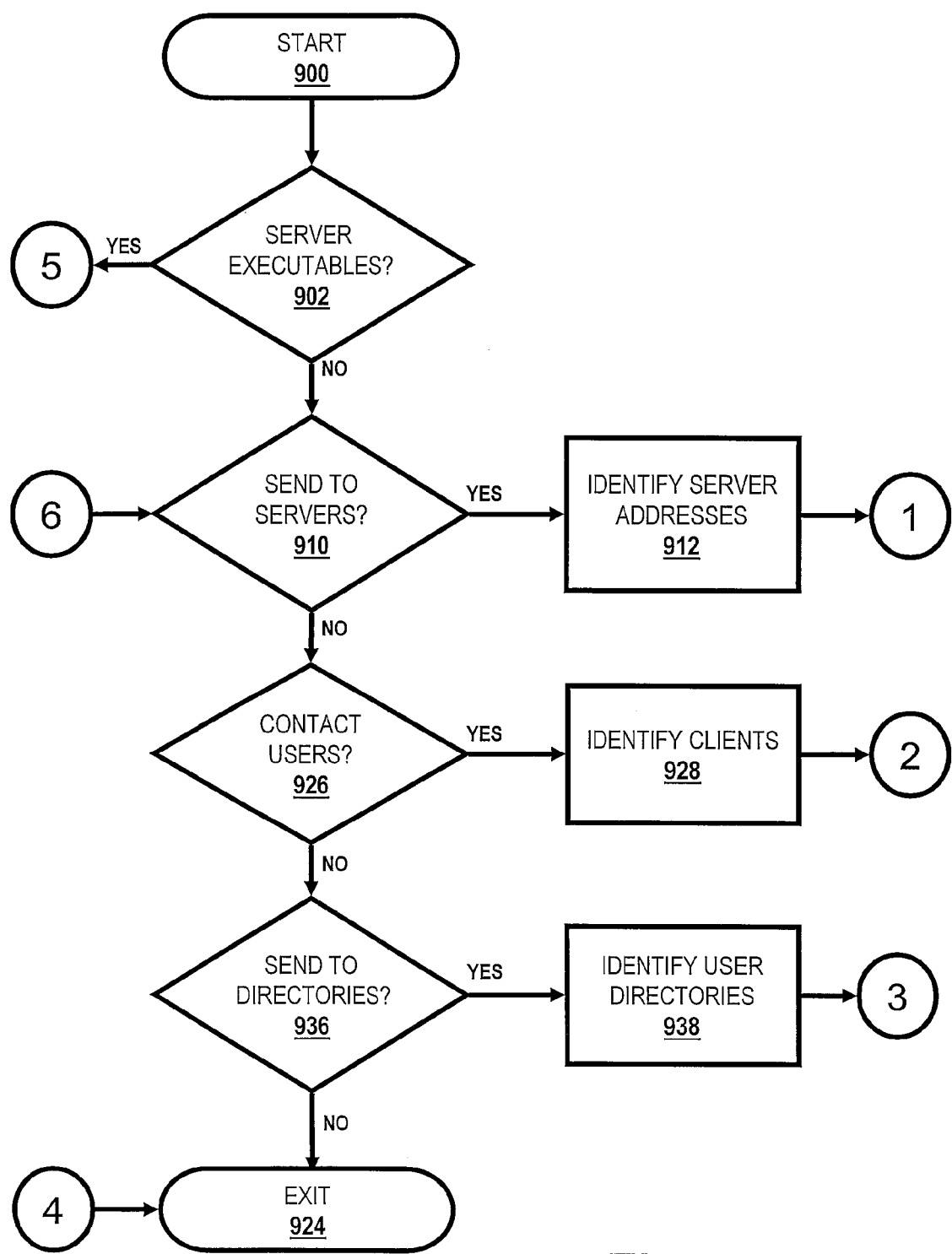
FIGS. 9a-b show a high-level flow chart of steps taken to deploy software capable of executing the steps shown in FIG. 1.
Figure 9B:
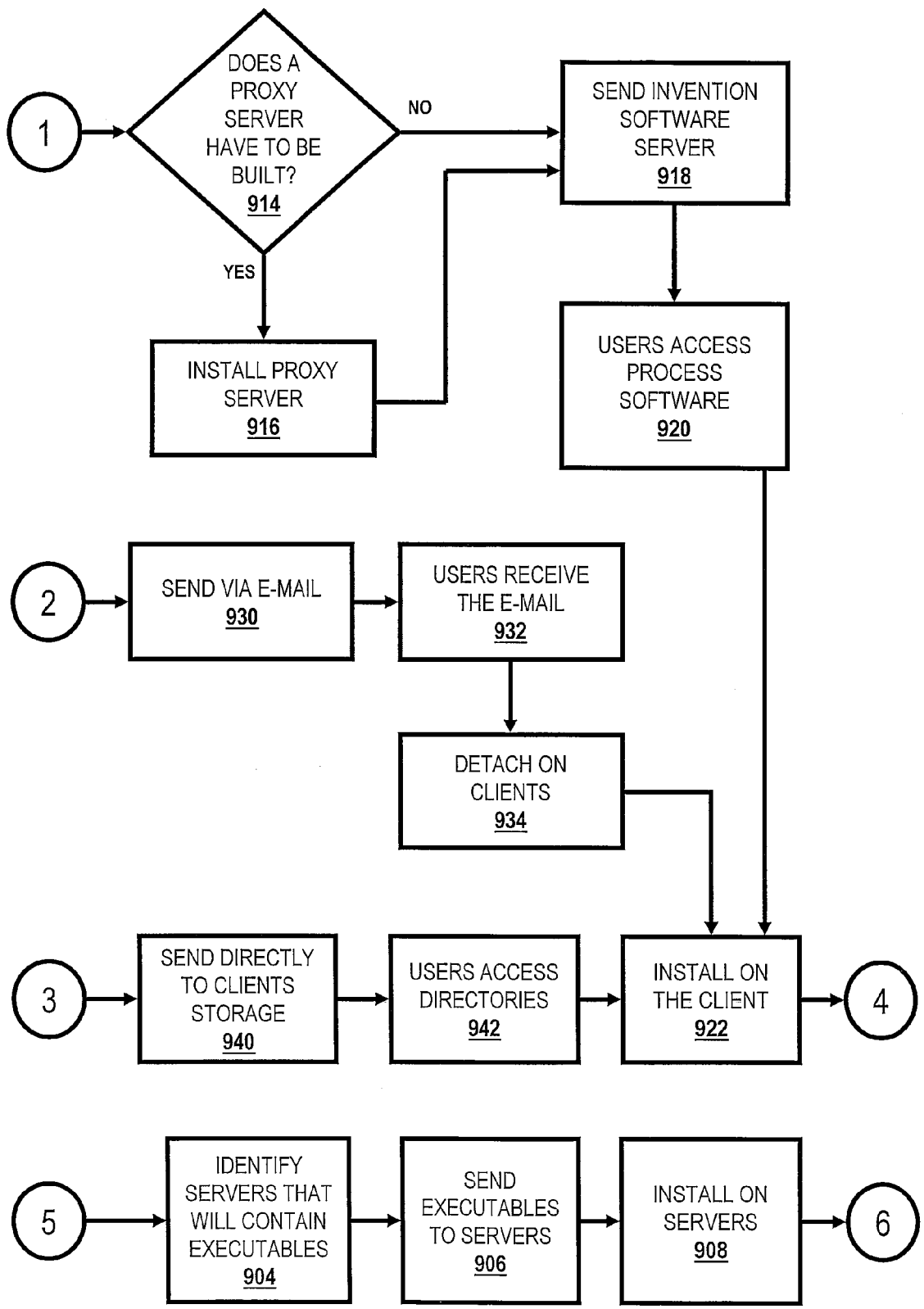

Thus, the method described in FIG. 1 can be deployed as a process software. Referring now to FIGS. 9a-b, step 900 begins the deployment of the process software. The first thing is to determine if there are any programs that will reside on a server or servers when the process software is executed (query block 902). If this is the case, then the servers that will contain the executables are identified (block 904). The process software for the server or servers is transferred directly to the servers' storage via File Transfer Protocol (FTP) or some other protocol or by copying though the use of a shared file system (block 906). The process software is then installed on the servers (block 908).

Next, a determination is made on whether the process software is be deployed by having users access the process software on a server or servers (query block 910). If the users are to access the process software on servers, then the server addresses that will store the process software are identified (block 912).

A determination is made if a proxy server is to be built (query block 914) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 916). The process software is sent to the servers either via a protocol such as FTP or it is copied directly from the source files to the server files via file sharing (block 918). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 920). Another embodiment is to have the servers automatically copy the process software to each client and then run the installation program for the process software at each client computer. The user executes the program that installs the process software on his client computer (block 922) then exits the process (terminator block 924).

In query step 926, a determination is made whether the process software is to be deployed by sending the process software to users via e-mail. The set of users where the process software will be deployed are identified together with the addresses of the user client computers (block 928). The process software is sent via e-mail to each of the users' client computers (block 930). The users then receive the e-mail (block 932) and then detach the process software from the e-mail to a directory on their client computers (block 934). The user executes the program that installs the process software on his client computer (block 922) then exits the process (terminator block 924).

Lastly a determination is made on whether to the process software will be sent directly to user directories on their client computers (query block 936). If so, the user directories are identified (block 938). The process software is transferred directly to the user's client computer directory (block 940). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 942). The user executes the program that installs the process software on his client computer (block 922) and then exits the process (terminator block 924).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called tunnel interfaces, where the packet enters and exits the network.

Figure 10A:
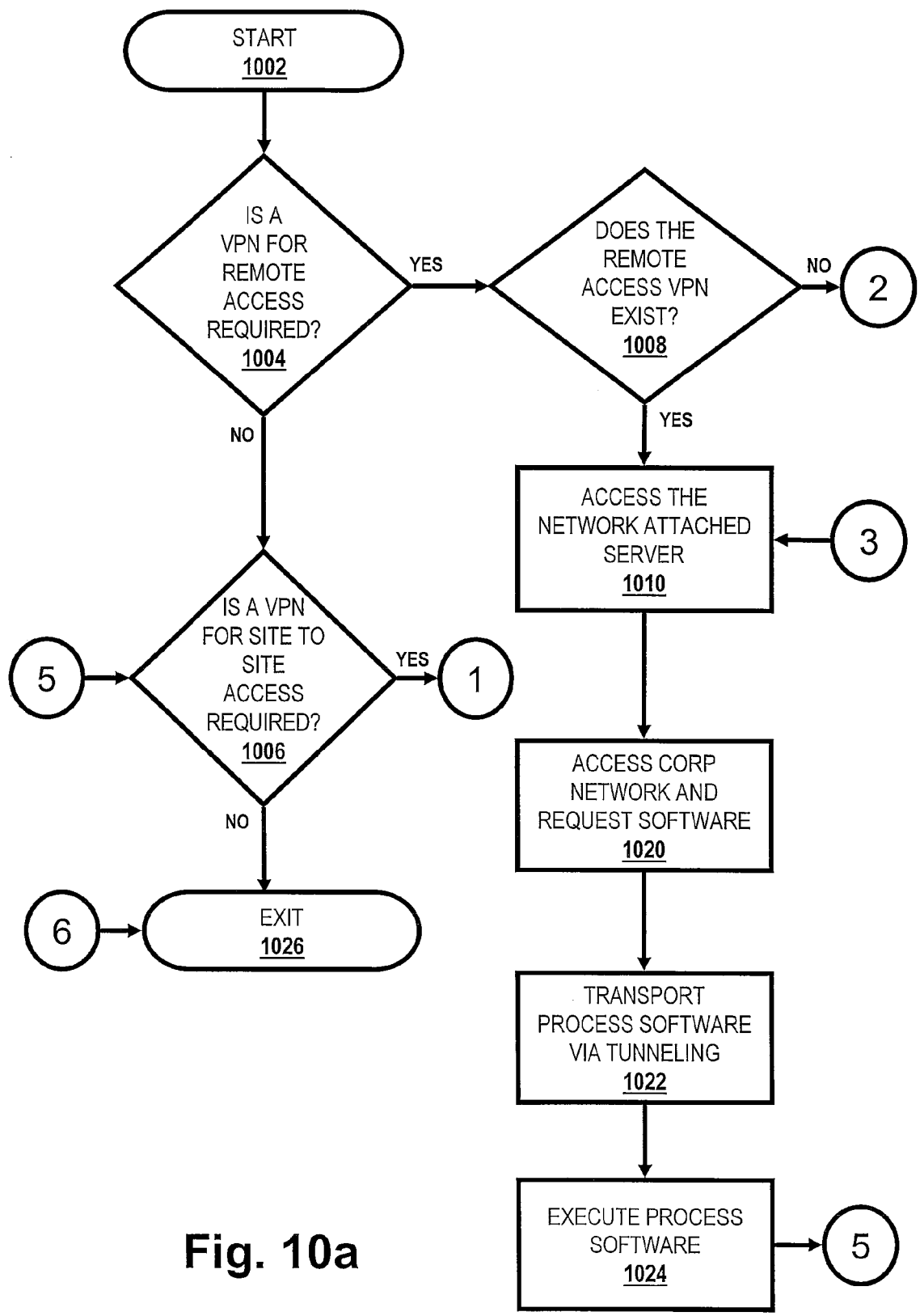
FIGS. 10a-c show a high-level flow chart of steps taken to deploy in a Virtual Private Network (VPN) software that is capable of executing the steps shown in FIG. 1.
Figure 10B:
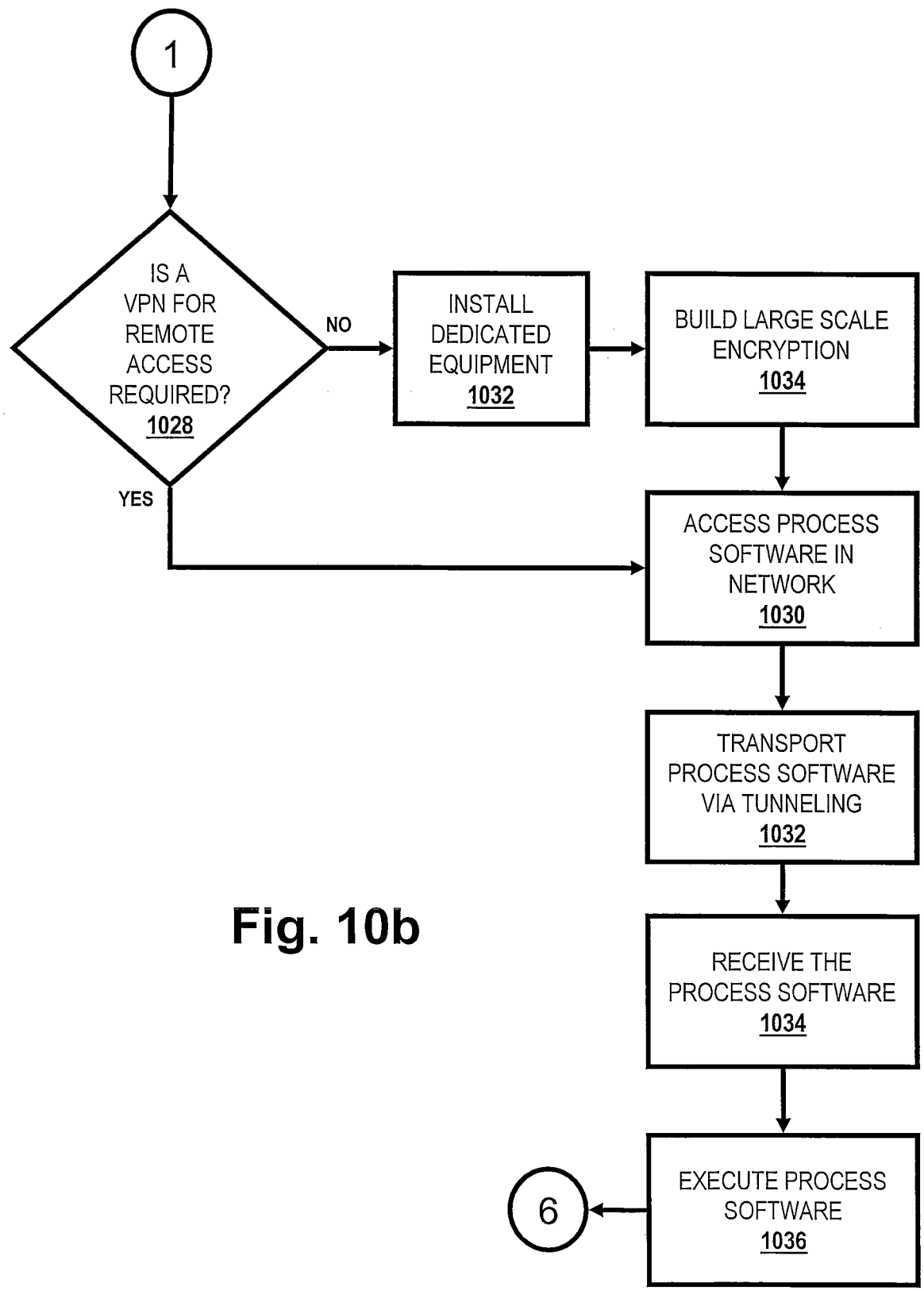
Figure 10C:
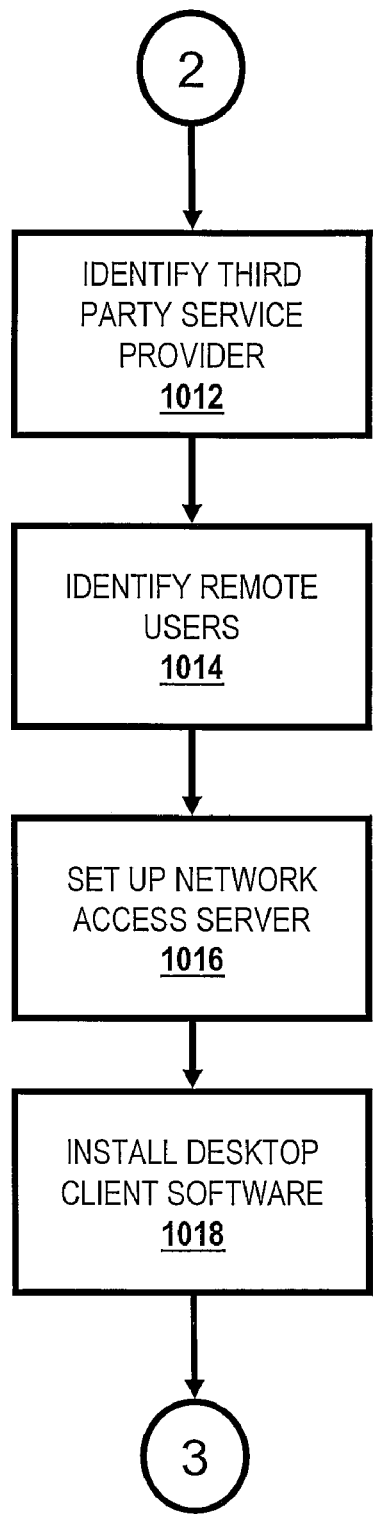

The process for such VPN deployment is described in FIGS. 10a-c. Initiator block 1002 begins the Virtual Private Network (VPN) process. A determination is made to see if a VPN for remote access is required (query block 1004). If it is not required, then proceed to (query block 1006). If it is required, then determine if the remote access VPN exists (query block 1008).

If a VPN does exist, then proceed to block 1010. Otherwise identify a third party provider that will provide the secure, encrypted connections between the company's private network and the company's remote users (block 1012). The company's remote users are identified (block 1014). The third party provider then sets up a network access server (NAS) (block 1016) that allows the remote users to dial a toll free number or attach directly via a broadband modem to access, download and install the desktop client software for the remote-access VPN (block 1018).

After the remote access VPN has been built or if it been previously installed, the remote users can access the process software by dialing into the NAS or attaching directly via a cable or DSL modem into the NAS (block 1010). This allows entry into the corporate network where the process software is accessed (block 1020). The process software is transported to the remote user's desktop over the network via tunneling. That is the process software is divided into packets and each packet including the data and protocol is placed within another packet (block 1022). When the process software arrives at the remote user's desktop, it is removed from the packets, reconstituted and then is executed on the remote users desktop (block 1024).

A determination is then made to see if a VPN for site to site access is required (query block 1006). If it is not required, then proceed to exit the process (terminator block 1026). Otherwise, determine if the site to site VPN exists (query block 1028). If it does exist, then proceed to block 1030. Otherwise, install the dedicated equipment required to establish a site to site VPN (block 1032). Then build the large scale encryption into the VPN (block 1034).

After the site to site VPN has been built or if it had been previously established, the users access the process software via the VPN (block 1030). The process software is transported to the site users over the network via tunneling (block 1032). That is the process software is divided into packets and each packet including the data and protocol is placed within another packet (block 1034). When the process software arrives at the remote user's desktop, it is removed from the packets, reconstituted and is executed on the site users desktop (block 1036). The process then ends at terminator block 1026.

Software Integration

The process software which consists code for implementing the process described in FIG. 1 may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 11A:
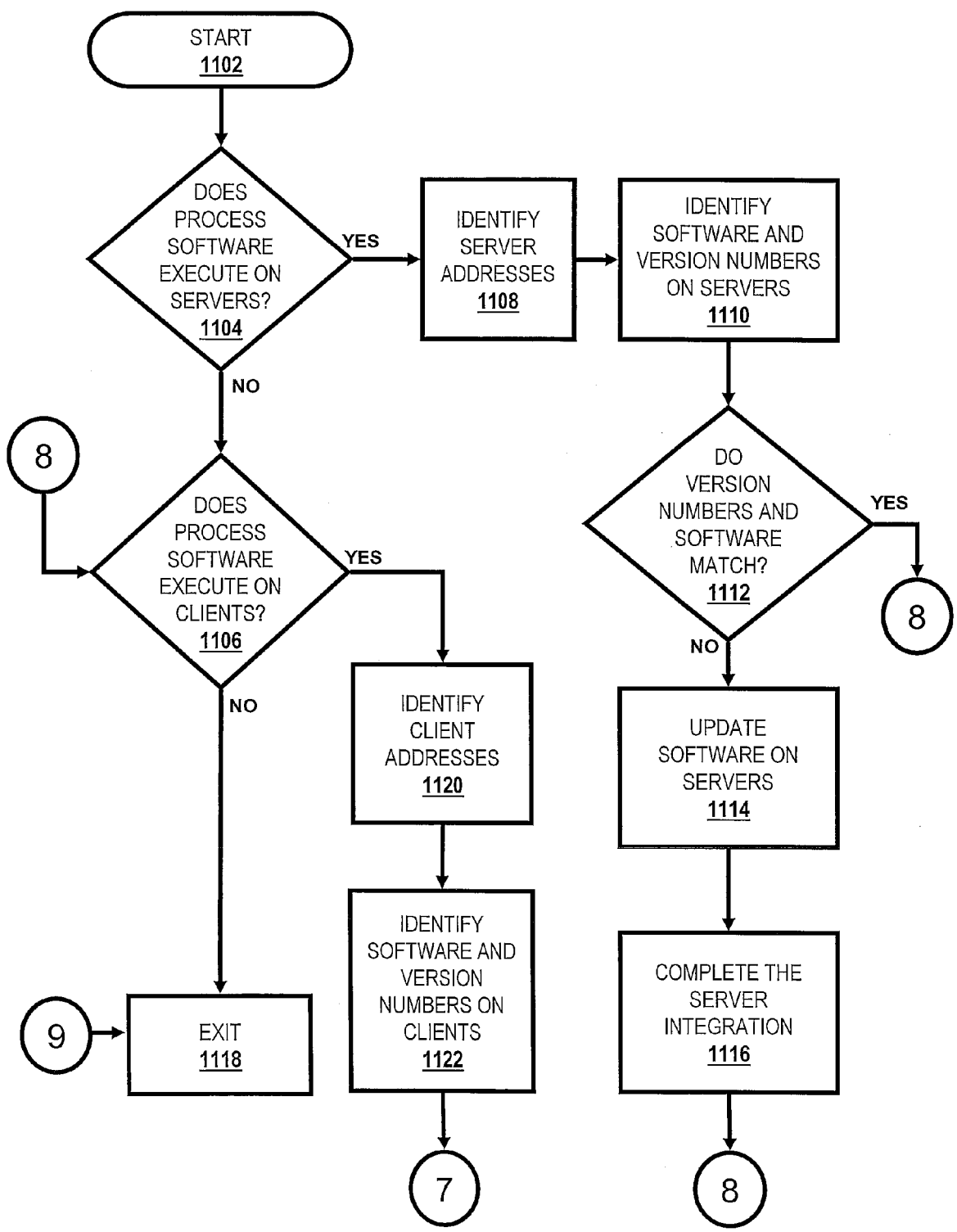
FIGS. 11a-b show a high-level flow chart showing steps taken to integrate into an computer system software that is capable of executing the steps shown in FIG. 1.
Figure 11B:
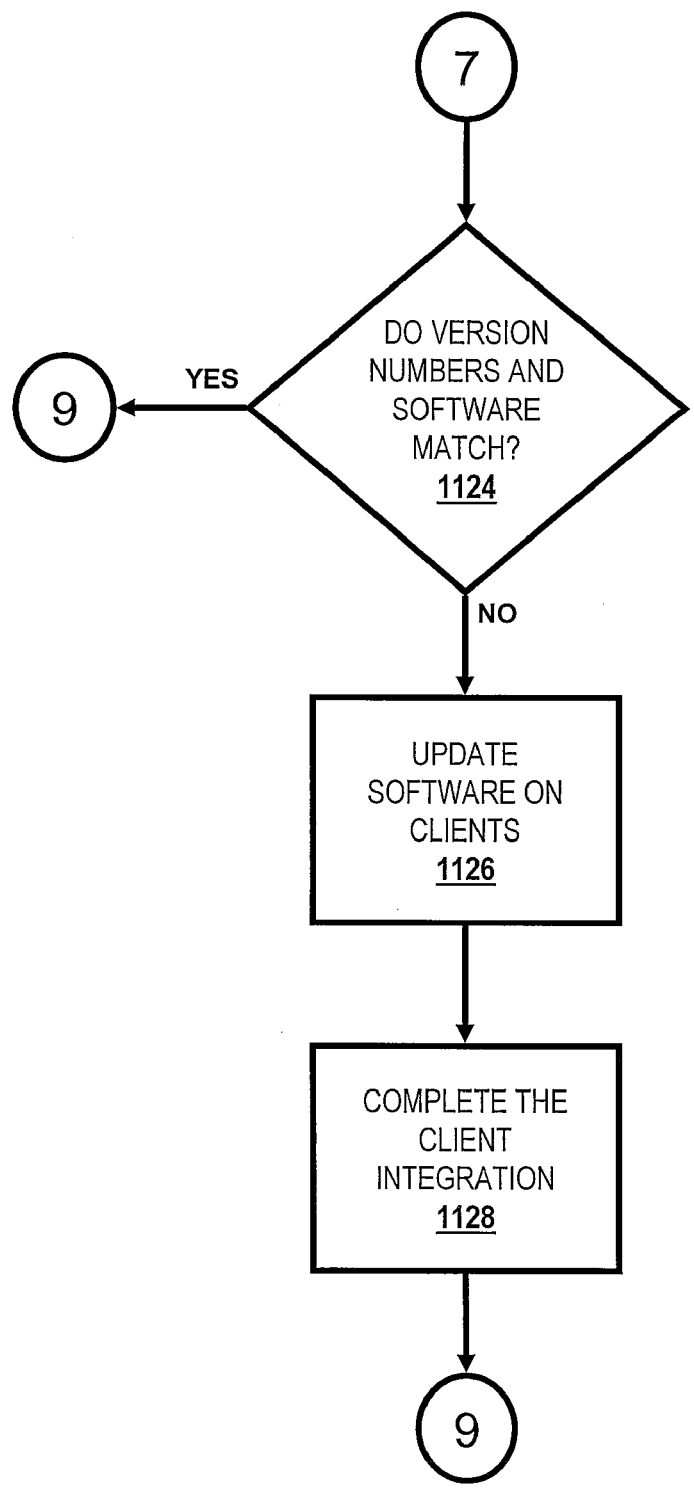

For a high-level description of this process, reference is now made to FIGS. 11*a*-*b*. Initiator block 1102 begins the integration of the process software. The first thing is to determine if there are any process software programs that will execute on a server or servers (block 1104). If this is not the case, then integration proceeds to query block 1106. If this is the case, then the server addresses are identified (block 1108). The servers are checked to see if they contain software that includes the operating system (OS), applications, and network operating systems (NOS), together with their version numbers, which have been tested with the process software (block 1110). The servers are also checked to determine if there is any missing software that is required by the process software in block 1110.

A determination is made if the version numbers match the version numbers of OS, applications and NOS that have been tested with the process software (block 1112). If all of the versions match and there is no missing required software the integration continues in query block 1106.

If one or more of the version numbers do not match, then the unmatched versions are updated on the server or servers with the correct versions (block 1114). Additionally if there is missing required software, then it is updated on the server or servers in the step shown in block 1114. The server integration is completed by installing the process software (block 1116).

The step shown in query block 1106, which follows either the steps shown in block 1104, 1112 or 1116 determines if there are any programs of the process software that will execute on the clients. If no process software programs execute on the clients, then the integration proceeds to terminator block 1118 and exits. If process software does execute on the clients, then the client addresses are identified as shown in block 1120.

The clients are checked to see if they contain software that includes the operating system (OS), applications, and network operating systems (NOS), together with their version numbers, which have been tested with the process software (block 1122). The clients are also checked to determine if there is any missing software that is required by the process software in the step described by block 1122.

A determination is made is the version numbers match the version numbers of OS, applications and NOS that have been tested with the process software (query block 1124). If all of the versions match and there is no missing required software, then the integration proceeds to terminator block 1118 and exits.

If one or more of the version numbers do not match, then the unmatched versions are updated on the clients with the correct versions (block 1126). In addition, if there is missing required software then it is updated on the clients (also block 1126). The client integration is completed by installing the process software on the clients (block 1128). The integration proceeds to terminator block 1118 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 12A:
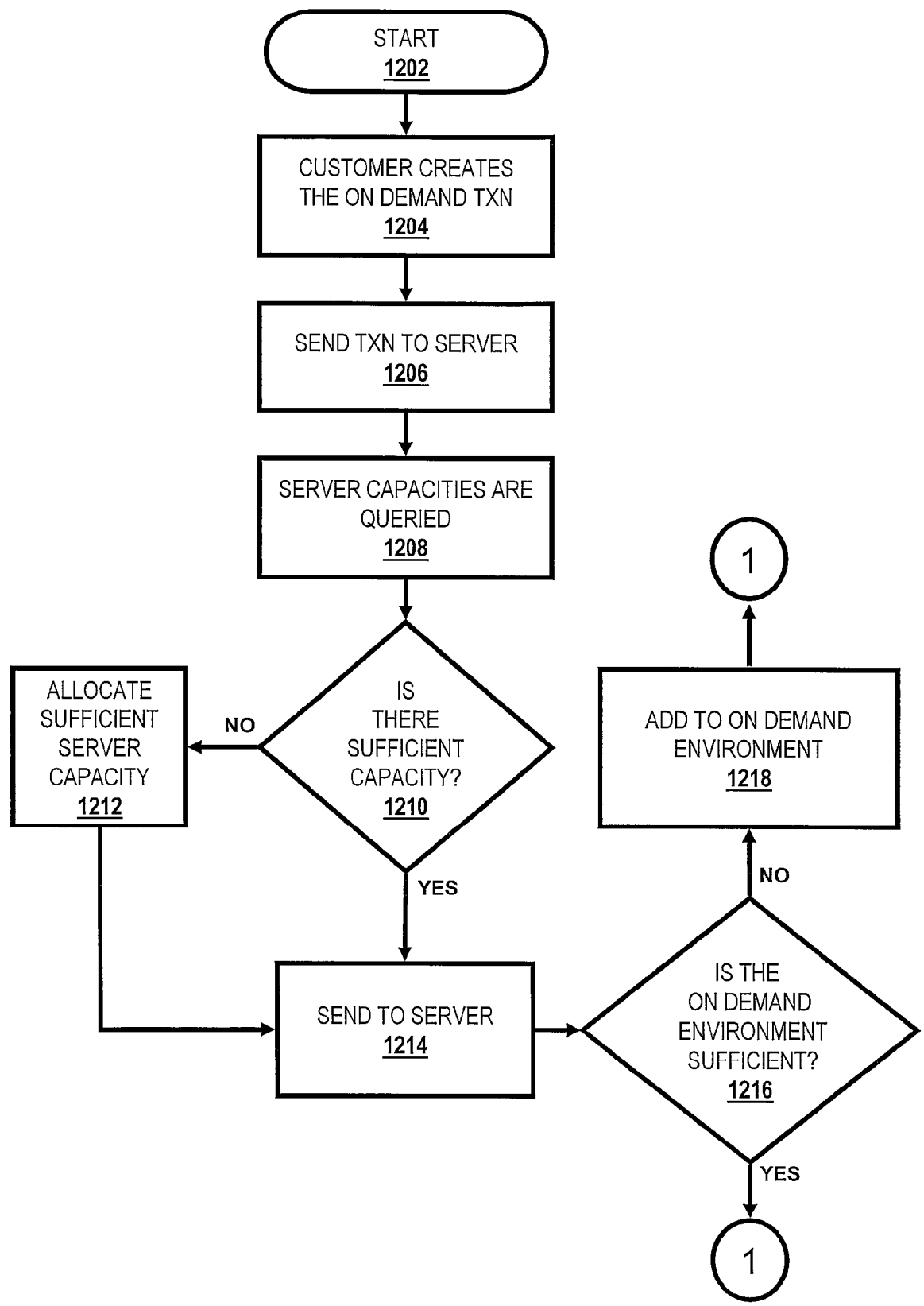
FIGS. 12a-b show a high-level flow chart showing steps taken to execute the steps shown in FIG. 1 using an on-demand service provider.
Figure 12B:
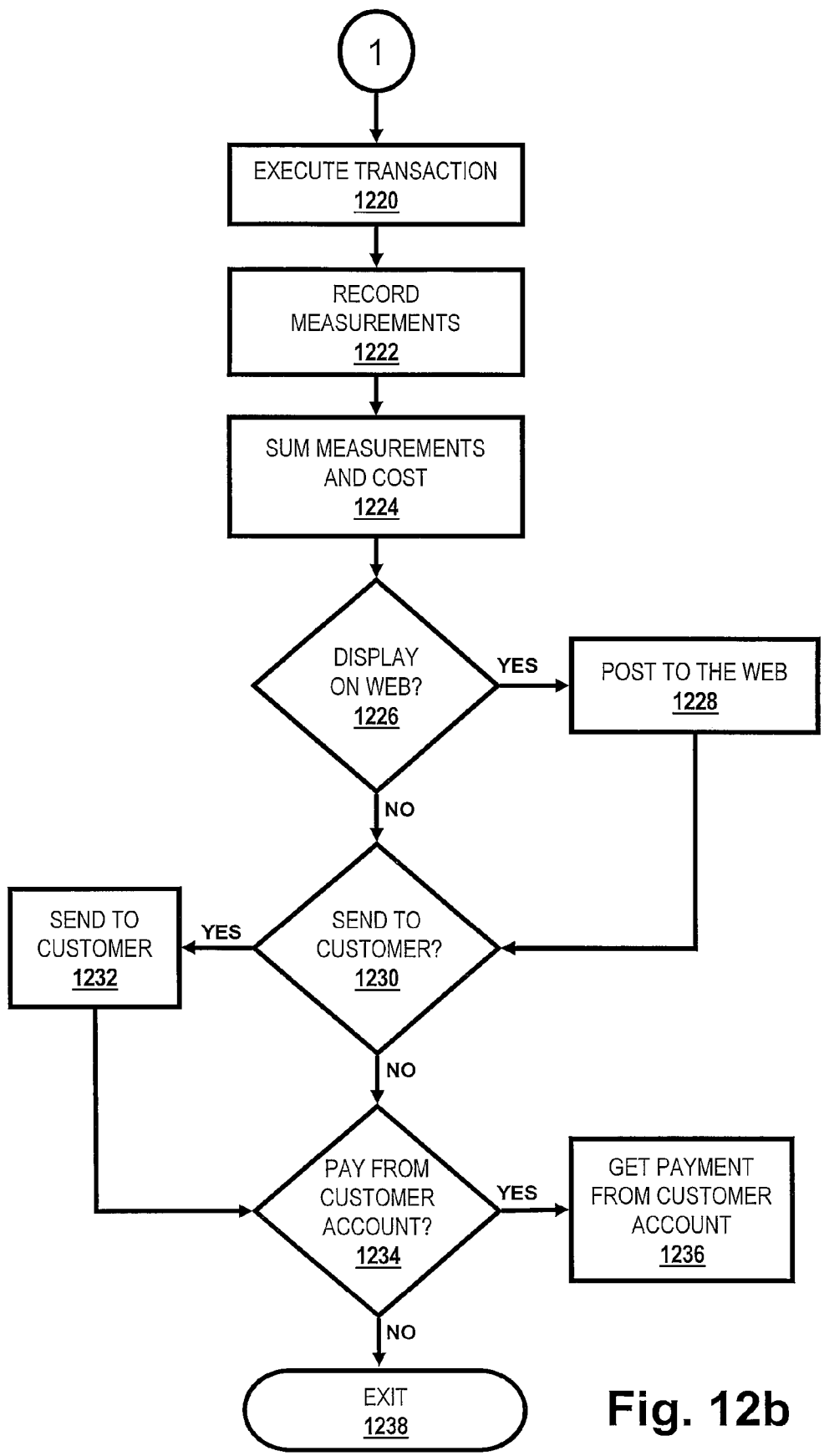

With reference now to FIGS. 12a-b, initiator block 1202 begins the On Demand process. A transaction is created than contains the unique customer identification, the requested service type and any service parameters that further specify the type of service (block 1204). The transaction is then sent to the main server (block 1206). In an On Demand environment the main server can initially be the only server, then as capacity is consumed other servers are added to the On Demand environment.

The server central processing unit (CPU) capacities in the On Demand environment are queried (block 1208). The CPU requirement of the transaction is estimated, then the servers available CPU capacity in the On Demand environment are compared to the transaction CPU requirement to see if there is sufficient CPU available capacity in any server to process the transaction (query block 1210). If there is not sufficient server CPU available capacity, then additional server CPU capacity is allocated to process the transaction (block 1212). If there was already sufficient Available CPU capacity then the transaction is sent to a selected server (block 1214).

Before executing the transaction, a check is made of the remaining On Demand environment to determine if the environment has sufficient available capacity for processing the transaction. This environment capacity consists of such things as but not limited to network bandwidth, processor memory, storage etc. (block 1216). If there is not sufficient available capacity, then capacity will be added to the On Demand environment (block 1218). Next the required software to process the transaction is accessed, loaded into memory, then the transaction is executed (block 1220).

The usage measurements are recorded (block 1222). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1224).

If the customer has requested that the On Demand costs be posted to a web site (query block 1226), then they are posted (block 1228). If the customer has requested that the On Demand costs be sent via e-mail to a customer address (query block 1230), then these costs are sent to the customer (block 1232). If the customer has requested that the On Demand costs be paid directly from a customer account (query block 1234), then payment is received directly from the customer account (block 1236). The On Demand process is then exited at terminator block 1238.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   receiving an identifier for a desired product;
   determining a final physical location of the desired product;
   receiving a signal identifiying a current real-time physical location of a product searcher;
   generating a set of one or more instructions describing a travel pathway from a starting physical location of the product searcher to the final physical location of the desired product; and
   generating an image, for use on a display, that depicts a real-time changing physical scenery as viewed by the product searcher as the item searcher travels along the travel pathway, wherein the real-time changing physical scenery is a same scenery image as the product searcher sees with unaided human vision;
   wherein the real-time changing physical scenery is created from a pre-recorded animation of the same scenery image seen by the product searcher with unaided human vision.

2. The method of claim 1, further comprising:
   generating an image of a stocking area on which the desired product is placed when the product searcher reaches the stocking area, wherein a particular area on the stocking area in which the desired product should be stocked is highlighted on the image of the stocking area.

3. The method of claim 2, further comprising:
   transmitting the image that depicts the real-time changing physical scenery to a wireless device.

4. The method of claim 1, further comprising:
   in response to a determination that the product searcher is not at a facility in which the desired product is located, generating a map to a nearest facility that has the desired product in stock.

5. The method of claim 1, further comprising:
   receiving a real-time location of wireless device used by the product searcher via a Global Positioning System (GPS) receiver in the wireless device.

6. A server comprising a processing module coupled to a memory, wherein the memory comprises a plurality of instructions executable by the processing module, which when executed, cause the processing module to perform a method comprising:
   receiving an identifier for a desired product;
   determining a final physical location of the desired product;
   receiving a signal identifying a current real-time physical location of a product searcher;
   generating a set of one or more instructions describing a travel pathway from a starting physical location of the product searcher to the final physical location of the desired product; and
   generating an image, for use on a display, that depicts a real-time changing physical scenery as viewed by the product searcher as the item searcher travels along the travel pathway, wherein the real-time changing physical scenery is a same scenery image as the product searcher sees with unaided human vision;
   wherein the real-time changing physical scenery is created from a pre-recorded animation of the same scenery image seen by the product searcher with unaided human vision.

7. The server of claim 6, wherein the instructions are further configured for:
   generating an image of a stocking area on which the desired product is placed when the product searcher reaches the stocking area, wherein a particular area on the stocking area in which the desired product should be stocked is highlighted on the image of the stocking area.

8. The server of claim 7, wherein the instructions are further configured for:

transmitting the image that depicts the real-time changing physical scenery to a wireless device.

9. The server of claim 6, wherein the instructions are further configured for:
in response to a determination that the product searcher is not at a facility in which the desired product is located, generating a map to a nearest facility that has the desired product in stock.

10. The server of claim 6, wherein the instructions are further configured for:
receiving a real-time location of wireless device used by the product searcher via a Global Positioning System (GPS) receiver in the wireless device.

11. A machine-readable medium having a plurality of instructions processable by a machine embodied therein, wherein said plurality of instructions, when processed by said machine causes said machine to perform a method comprising:
receiving an identifier for a desired product;
determining a final physical location of the desired product;
receiving a signal identifying a current real-time physical location of a product searcher;
generating a set of one or more instructions describing a travel pathway from a starting physical location of the product searcher to the final physical location of the desired product; and
generating an image, for use on a display, that depicts a real-time changing physical scenery as viewed by the product searcher as the item searcher travels along the travel pathway, wherein the real-time changing physical scenery is a same scenery image as the product searcher sees with unaided human vision;
wherein the real-time changing physical scenery is created from a pre-recorded animation of the same scenery image seen by the product searcher with unaided human vision.

12. The machine-readable medium of claim 11, further comprising processable instructions for:
generating an image of a stocking area on which the desired product is placed when the product searcher reaches the stocking area, wherein a particular area on the stocking area in which the desired product should be stocked is highlighted on the image of the stocking area.

13. The machine-readable medium of claim 12, further comprising processable instructions for:
transmitting the image that depicts the real-time changing physical scenery to a wireless device.

14. The machine-readable medium of claim 11, further comprising processable instructions for:
in response to a determination that the product searcher is not at a facility in which the desired product is located, generating a map to a nearest facility that has the desired product in stock; and
transmitting the map to the nearest facility that has the desired product to a wireless device.

15. The machine-readable medium of claim 11, further comprising processable instructions for:
receiving a real-time location of wireless device used by the product searcher via a Global Positioning System (GPS) receiver in the wireless device.

16. The machine-readable medium of claim 11, wherein the processable instructions are deployed to a server from a remote location.

17. The machine-readable medium of claim 11, wherein the processable instructions are provided by a service provider to a customer on an on-demand basis.

* * * * *